H. LINDSAY.
APPARATUS FOR TESTING AND TRUING WOVEN WIRE BELTS.
APPLICATION FILED FEB. 18, 1915.
1,161,703.
Patented Nov. 23, 1915.
4 SHEETS—SHEET 1.
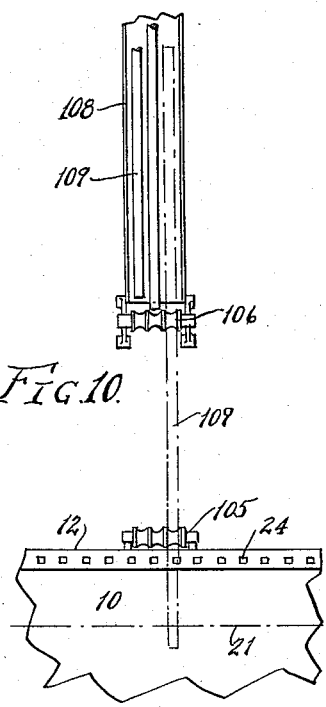
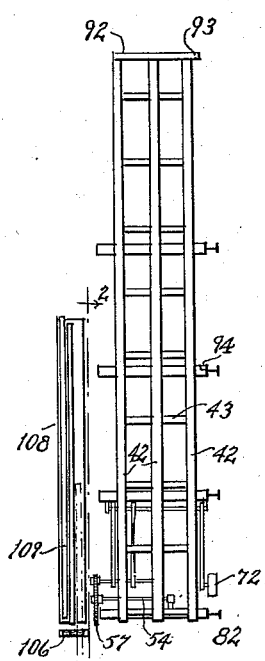
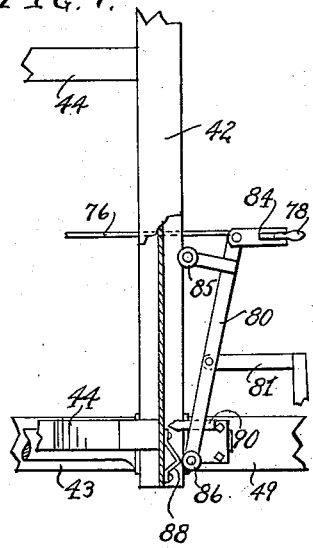
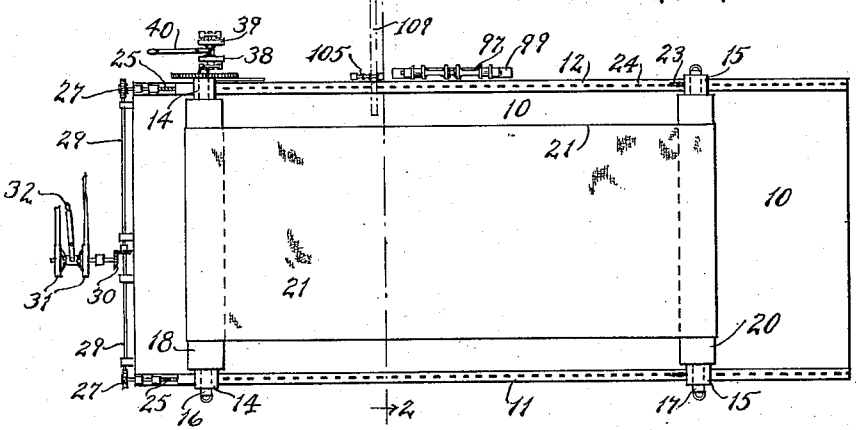

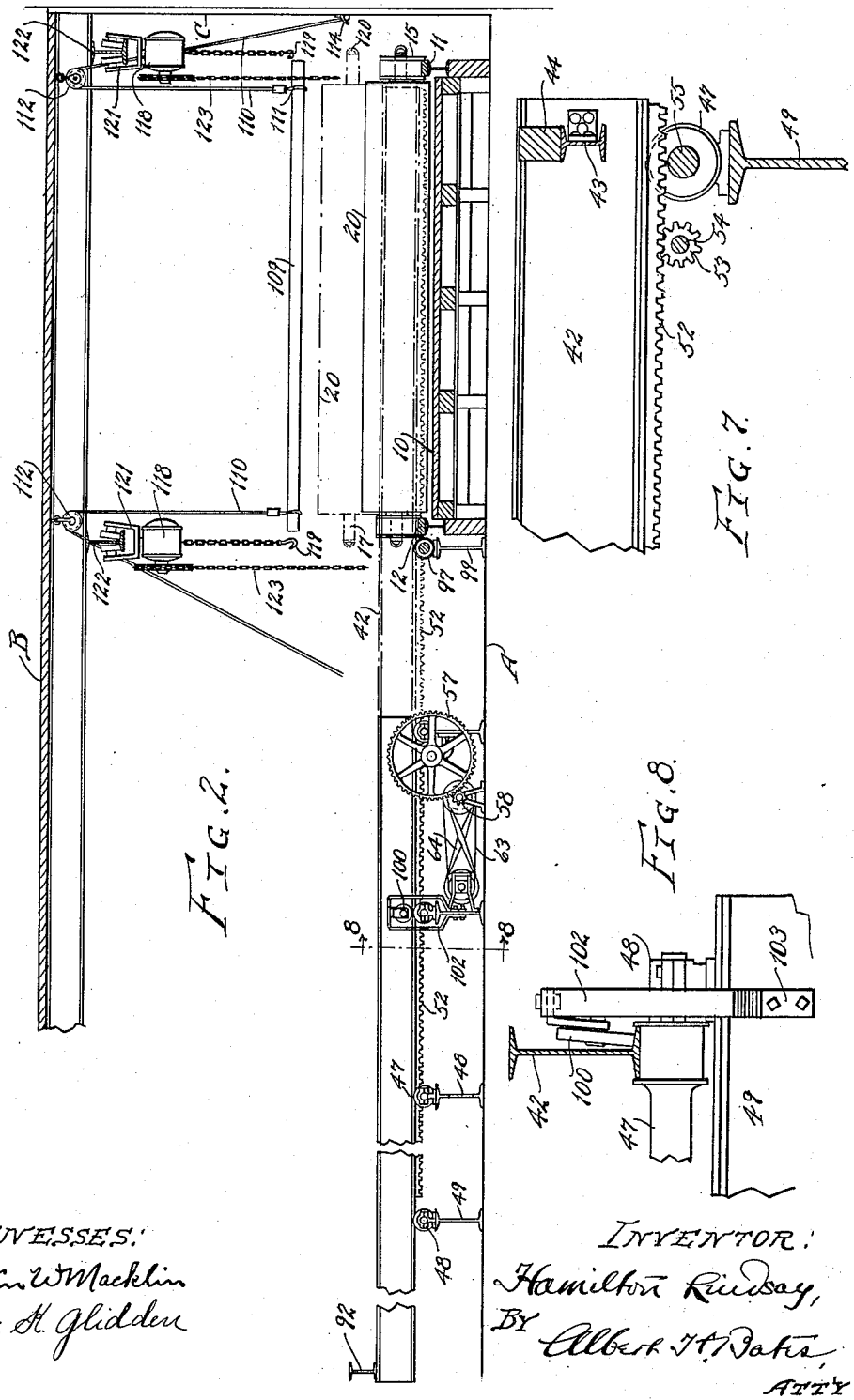

H. LINDSAY.
APPARATUS FOR TESTING AND TRUING WOVEN WIRE BELTS.
APPLICATION FILED FEB. 18, 1915.
1,161,703.
Patented Nov. 23, 1915.
4 SHEETS—SHEET 3.
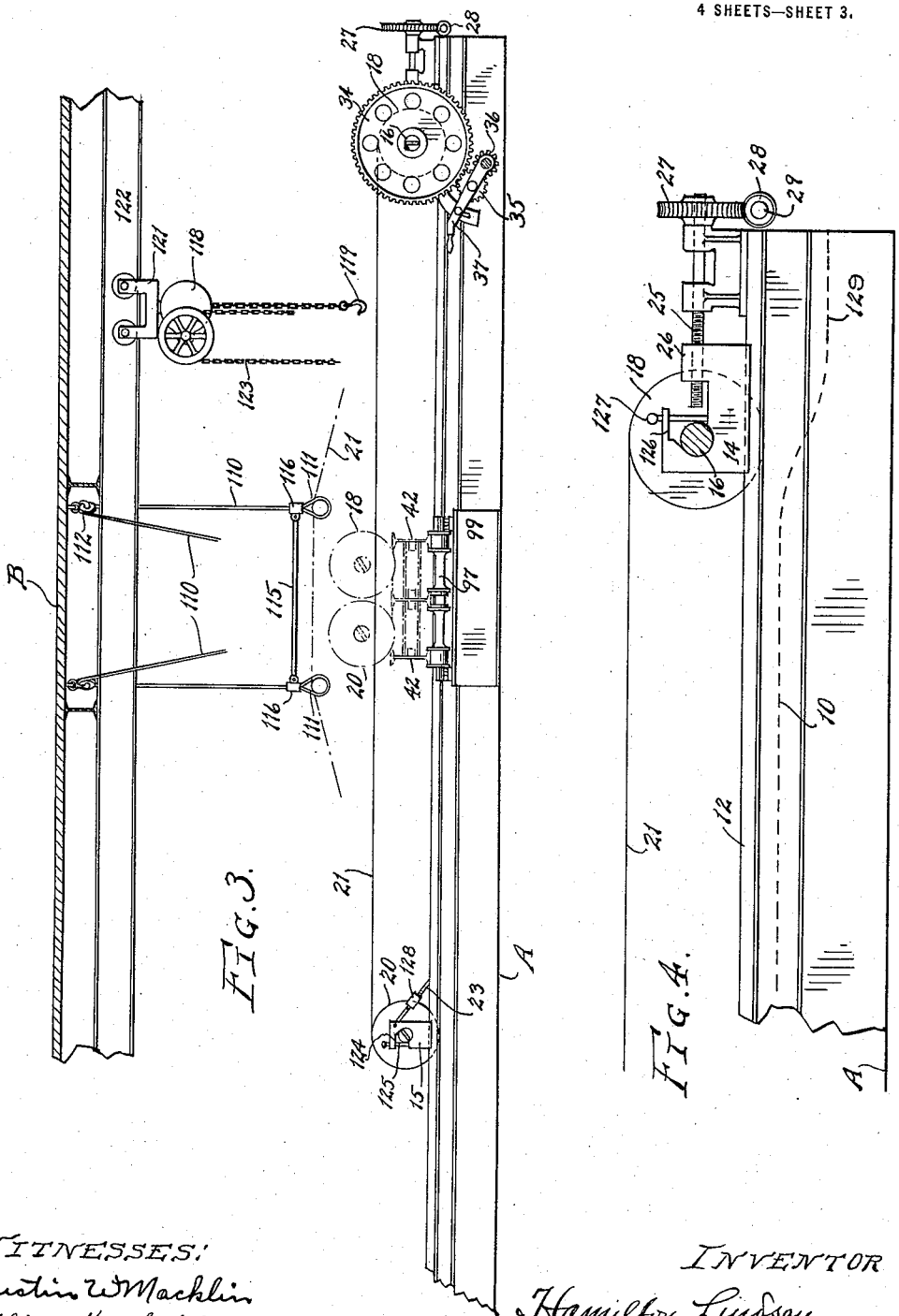

H. LINDSAY.
APPARATUS FOR TESTING AND TRUING WOVEN WIRE BELTS.
APPLICATION FILED FEB. 18, 1915.
1,161,703.
Patented Nov. 23, 1915.
4 SHEETS—SHEET 4.
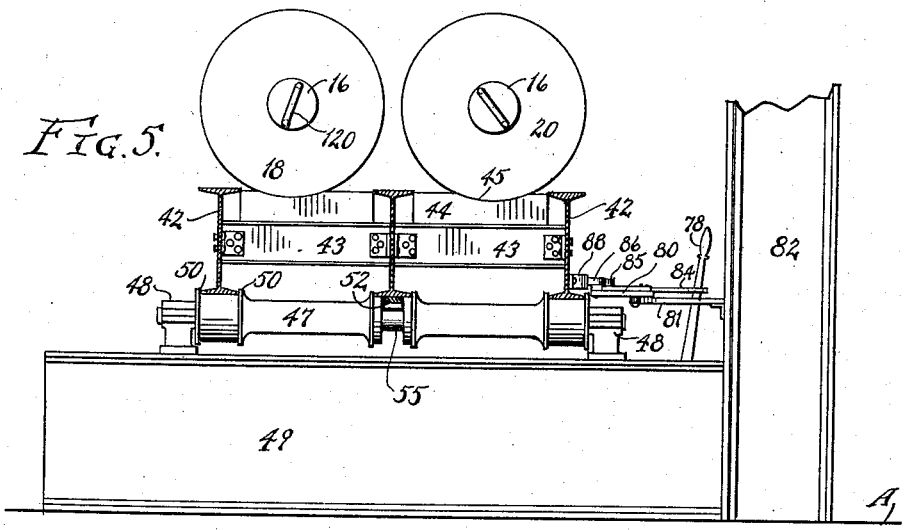
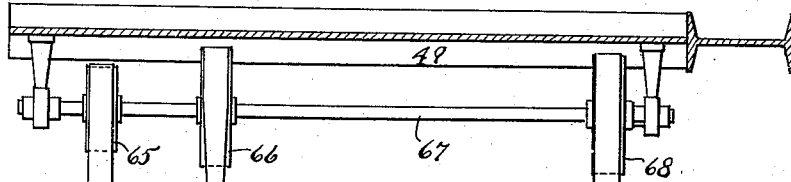
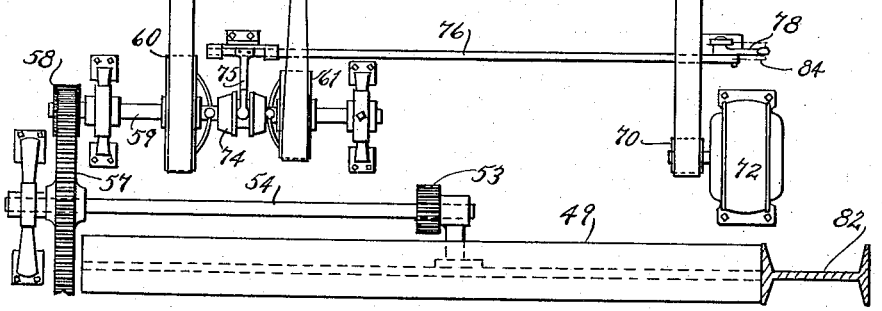
WITNESSES:
Justin W Macklin
Alice H. Glidden
INVENTOR:
Hamilton Lindsay,
BY Albert H. Bates, ATT'Y
COLUMBIA PLANOGRAPH CO., WASHINGTON, D. C.

UNITED STATES PATENT OFFICE.

HAMILTON LINDSAY, OF CLEVELAND, OHIO, ASSIGNOR TO THE LINDSAY WIRE WEAVING COMPANY, OF CLEVELAND, OHIO, A CORPORATION OF OHIO.

APPARATUS FOR TESTING AND TRUING WOVEN-WIRE BELTS.

1,161,703.

Specification of Letters Patent. Patented Nov. 23, 1915.

Application filed February 18, 1915. Serial No. 9,154.

*To all whom it may concern:*

Be it known that I, HAMILTON LINDSAY, a citizen of the United States, residing at Cleveland, in the county of Cuyahoga and State of Ohio, have invented a certain new and useful Improvement in Apparatus for Testing and Truing Woven-Wire Belts, of which the following is a full, clear, and exact description, reference being had to the accompanying drawings.

In the manufacture of large woven-wire belts, such as are used in modern paper-making machines, it is necessary to test the belts, stretch them and true them, so that they will run evenly on the rollers when in use without a tendency to shift laterally along the same. In a testing apparatus for such belts there are usually two large rollers over which the belt may be run and which may be moved to change the distance between them for the purpose of stretching the belt when it is in position. The width of these belts varies, being sometimes as great as twenty feet or more, and it is requisite to make them endless before testing. Because of the nature of the wire fabric in these belts, it is very necessary not to sharply fold or wrinkle them, for this would cause uneven spots or creases in the belt, which would quickly wear through when in use, rendering the belt worthless. It is also essential to carefully remove any projecting or raised wire threads in the fabric, for the same reason. In the handling of these large belts, great difficulty has been experienced in placing them on the rollers and removing them, without wrinkling, folding or otherwise injuring the belt. To accomplish this, I prefer to lay the belt on a flat surface, as a smooth floor or platform, at the sides of which are means for carrying the rollers, carefully raise the upper reach of the belt, preferably by lifting it on light poles, and then thrust the two rollers between the reaches of the belt and carry each roller by trolley hoists or similar means, to its proper position, and place it in bearings. The poles are then withdrawn and the rollers are moved apart to draw the belt taut and then rotated for various purposes in the process of testing.

An object of my present invention is to provide a simple, efficient means for handling these large heavy rollers without at any time allowing their weight to rest on any portion of the belt.

A more specific object is to provide means for thrusting the rollers under the upper reach of the belt while it is held upwardly.

Another object is to provide a simple means for raising the upper reach of the belt and holding it in a position suitable for the moving of the large rollers underneath the same.

Other objects and features of my invention will become apparent in the following specification which refers to the drawings, and the essential characteristics are set forth in the claims.

In the drawings, Figure 1 is a plan of my apparatus; Fig. 2 is a vertical section through the apparatus substantially on the line 2—2 of Fig. 1, showing a side elevation of the carriage for thrusting the rollers under the upper reach of the belt; Fig. 3 is a sectional side elevation of a portion of my apparatus, showing the rollers and belt in solid lines and showing in broken lines the position of the rollers, carriage and the upper reach of the belt when raised; Fig. 4 is an enlarged sectional side elevation of one of the rollers, and the means for moving it away from the other roller, and also indicating the floor or platform of the apparatus in dotted lines; Fig. 5 is a vertical section looking toward the end of the rollers when in position on the carriage; Fig. 6 is a sectional plan of mechanism for driving the carriage; Fig. 7 is a vertical longitudinal section through a portion of the carriage, showing the pinion and rack for driving the same; Fig. 8 is a sectional detail taken substantially on the line 8—8 of Fig. 2; Fig. 9 is a sectional plan, showing a detail of mechanism for stopping the carriage at each end of its movement, and Fig. 10 is a sectional plan of the means for handling the light poles by which the belt is raised and the poles on which it is wound before and after testing.

My apparatus is preferably mounted in a large room, the floor and ceiling of which are indicated by A and B respectively.

10 indicates a rectangular platform suitably supported above the floor.

11 and 12 indicate rails at each side of the platform and running longitudinally thereof and on which are slidably mounted two pairs of bearing boxes 14 and 15, adapted to receive trunnions 16 and 17 respectively, formed on the ends of the large rollers 18 and 20. 21 indicates a woven wire belt in position on these rollers for testing.

As the lengths of the belts vary, it is desirable to slide the bearing members 15 away from the members 14 to the desired point, and secure them by means of braces, indicated at 23, which are attached to the bearing boxes at one end and have their other end engaging depressed recesses 24 in the rails. When the roller 20 is thus secured, the roller 18 may be drawn away from the same to tighten the belt by means of screws 25, shown as threaded through a portion 26 rigid on each of the bearing members 14 and driven by worm gears 27, which are in turn driven by worms 28 on a shaft 29. The shaft 29 may be driven in either direction, to tighten or loosen the belt, by bevel gears indicated at 30, and shown as driven by a pair of belts running in opposite directions over pulleys 31, either of which may be clutched with the shaft by means of a suitable shifter indicated at 32.

A suitable mechanism for driving the roller 18, comprises a large gear 34, on one of the trunnions 16 of the roller 18, removably keyed thereto and which is driven in turn by a gear 35, meshing with a gear 36 and carried on an arm 37, which may be oscillated to throw the gear 35 into and out of engagement with the gear 34. The gear 36 is shown as driven by a pair of pulleys 38 and 39 (Fig. 1), running in opposite directions and controlled by the shifter lever 40.

Arranged at substantially right angles to the platform 10 and at a short distance therefrom, is a longitudinally movable carriage for the rollers 18 and 20. This carriage preferably comprises three I-beams 42, connected by short transverse members 43, also shown as being of I-beam construction, and suitably secured at each end to the I-beams 42. Resting on these transverse members are blocks 44 preferably made of a material, such as wood, which would not injure the surface of the rollers, and having in their upper surface arcuate depressions 45 adapted to conform to the surface of the rollers 18 and 20. The I-beam members 43, rest on transverse rollers 47, each having reduced portions at their ends supported in bearings 48, which are carried by transverse members 49, also preferably of I-beam construction, and shown as resting on the floor A. The rollers 47 have bearing surfaces for each of the I-beams and at each side of these surfaces are flanges 50, serving to guide the carriage. The middle I-beam is provided on its under side with a rack 52, which is engaged by a pinion 53, shown as mounted on a shaft 54, which may be rotated to reciprocate the carriage on its rollers. Each of the rollers 47 has a reduced portion 55 to clear the rack 52.

As a suitable mechanism for driving the pinion and rack, I have provided on the shaft 54, a large gear 57, driven in turn by a pinion 58 on a shaft 59, carrying two pulleys 60 and 61. These pulleys are driven in opposite directions by belts 63 and 64, running over pulleys 65 and 66 respectively, on a shaft 67, having a third pulley 68 driven by a belt 69, which is in turn driven by a small pulley 70, of a motor, indicated at 72. Each of the pulleys 60 or 61, may be clutched in turn with the shaft 59 by means of a shiftable clutch member 74, operated by an arm 75 carried on a rod 76, which may be shifted longitudinally by means of a lever 78, whereby the carriage may be driven in either direction.

It is desirable to provide a means for automatically stopping the carriage on its forward and return movements, in case the operator should not be watchful. Accordingly, I have provided a lever 80, pivoted on an arm 81, shown as carried on an upright I-beam 82 adjacent the I-beam 49, nearest the platform. This lever 80 is pivotally attached to a link 84 embracing the upper portion of the shift lever 78 and also carries two rollers 85 and 86, adapted to be engaged by a projection 88 carried on the I-beam 42. A similar projection, not shown, is carried near the other end of this same I-beam member, and in such position as to insure the stopping of the carriage in its forward movement at the proper point. If the carriage is being moved forwardly, the lever 78 is moved to the left (Figs. 6 and 9), clutching the pulley 60 with the shaft 59, and when the last mentioned projection engages the roller 85, it moves the lever 80, the link 84 and the lever 78, to the right, unclutching the pulley 60 from the shaft, stopping the carriage. If the carriage is being moved away from the platform, the lever 78 is moved to the right, clutching the pulley 61 to the shaft 59 and moving the roller 86 into the path of the projection 88, so that when it is engaged thereby the lever 80 will be moved, drawing the lever 78 to the right a sufficient distance to unclutch the pulley 61 from the shaft. A finger 90 may be provided, on a bearing 48 (shown in Fig. 9), overhanging a flange of the I-beam 42 of the carriage, and indicating by means of marks on that flange, the proper time for the operator to stop the carriage. I prefer to mount a transverse member 92 at the rear of the members 42 and secure it to each of them and overhanging the carriage at the right, as indicated at 93, to act as a brace and as an additional means for insuring the stopping of the carriage. This overhanging portion may engage a projection 94 mounted on one of the I-beams 82 (indicated in Fig. 1), in case the belt shifting device just described fails to operate, thus positively stopping the carriage, even against the power acting to drive it. As the carriage is moved forwardly it engages and is supported by a roller 97, corresponding to the rollers 47 and mounted on an I-beam member 99, similar to the members 49 and standing adjacent the rail 12 and the platform 10. Now as the carriage with the rollers in position thereon is moved underneath the belt to the position indicated in dot and dash lines in Fig. 2, the greater weight of the end of the carriage supporting the rollers tends to raise the rear of the carriage upwardly over the roller 97, as a pivot. This I may prevent by means of small wheels 100, engaging the outer lower flange of each outside I-beam 42 of the carriage. (One of these wheels is shown in Figs. 2 and 8.) These wheels are supported by brackets 102, which loop around the adjacent bearing 48 and the flange of the I-beam, and are secured to the I-beam as indicated at 103. By this construction any upward movement of the rear portion of the carriage is prevented, regardless of the position of the rollers 18 and 20.

When the belt is unrolled and laid along the platform 10, the upper reach of the belt is carefully raised by hand and light poles are thrust through the same, preferably, without at any time allowing the poles to rub against the fabric. I prefer to accomplish this by using a pair of roller stands 105 and 106, the stand 105 being adjacent the rail 12, and in alinement with these stands is a long table 108, on which the poles 109 may rest. To thrust the poles between the reaches of the belt, they are slid along the table and over these rollers, as indicated in dot and dash lines in Figs. 1 and 10, and the weight of the forward end of the pole is prevented from resting on the fabric of the lower reach by bearing downwardly on the rear of the pole or by providing two sets of superimposed rollers in the stand 106, the one set being adapted to engage the upper side of the roller to prevent it tilting on the rollers of the stand 105 as a pivot. When, however, the rear end of the roller comes out of engagement with the rollers 106, the forward end of the pole will swing downwardly, but I prevent it engaging the fabric of the lower reach when the width of the belt makes this possible, by thrusting a light smooth board beneath the end of this pole from the opposite side. When the poles have thus been placed between the reaches of the belt they may be raised, preferably by means of ropes 110, having loops 111 formed in their lower ends for receiving the poles, and extending over pulleys 112, shown as secured to the ceiling, the ropes leading downwardly again to a suitable position to be grasped by operators. The poles are raised evenly and substantially parallel to the platform, and may be held upwardly by attaching the ends of the ropes to hooks fastened at any convenient point, such for example as is shown at 114, attached to the side wall C of the room in which the apparatus is mounted. There are preferably two of these ropes above each side of the platform, as shown in Fig. 3, and they are held apart at their looped ends by distance rods 115, secured to collars 116 above each of the loops 111, so that the weight of the belt may not draw these poles together and allow the belt to come in contact with the rollers while they are being thrust underneath the upper reach of the same. When the upper reach of the belt has been raised on the poles, the rollers, which are in position on the carriage, are moved underneath this upper reach by driving the carriage forwardly, as heretofore described, bringing the rollers to the position indicated in dot and dash lines in Figs. 2 and 3. The rollers are then lifted from the carriage by means of hoists 118 having hooks 119, which engage suitable staples 120 at the ends of the trunnions of the rollers. These hoists are carried on trolleys 121, which travel on I-beam trackways 122, situated above the sides of the platform and preferably parallel therewith. At 123 are indicated hand chains for operating the hoists. As stated, the rollers are raised from the carriage by hooking onto both ends with the hoists, and then carrying the rollers to their respective bearings, into which they are lowered. The bearings 15 are shown as cut away at 124, to receive the trunnions, which may be prevented from rolling out of the same by removable pins 125, and the bearings 14 are similarly cut away at 126, and removable pins 127 retain the trunnions in position. When the rollers are thus placed in position with a belt drawn over them, the roller 20 is secured against movement by the braces 23, heretofore described; the roller 18 is then moved away from its companion by rotating the screws 25, as heretofore described, until the belt is made taut over the rollers, and the gear 34 having been placed in position is then rotated to revolve the belt for testing purposes. In testing the belt, it is desirable to stretch the same, which may be accomplished by the screws 25, and if one side of the belt is tighter than the other, so that it tends to "creep" along the rollers, this may be overcome by correspondingly stretching that side by turnbuckles 128, which may be provided in the braces 23. The belt is carefully examined throughout its entire surface by watching it as it turns over one of the rollers. The platform 10, being provided with a lower portion 129, adjacent the roller 18, allows a man to stand in an upright position while watching the belt adjacent the upper surface of the roller. All the uneven spots and flaws having been discovered and removed, and the belt having been properly stretched and trued, the belt is then slacked off. The poles are inserted beneath the upper reach and raised by the ropes 110, as before described, the carriage is then advanced across the platform beneath this upper reach in a position to recieve the rollers which are moved from the bearings to the carriage by the hoists. The carriage is then withdrawn, the poles supporting the upper reach are lowered and removed, after which the belt is wound onto suitable poles for transportation.

Having thus described my invention, what I claim is:

1. In an apparatus of the character described, the combination of a platform, a pair of rollers, means for mounting the rollers at separated positions over the platform, and a carriage for the rollers acting to move them longitudinally of the axes of the rollers across and above the platform from a position at one side of the platform.

2. The combination of a flat surface on which a large woven wire belt may be laid, a pair of rollers, means for mounting the rollers at separated positions over said surface, a carriage adapted to move the rollers from a position at one side of the surface transversely across and above the same, and means for moving the rollers above the surface from the carriage to the mounting means.

3. The combination of a platform on which a large woven wire belt may be laid, a pair of rollers, bearings for mounting the rollers at separated positions over the platform, a carriage for the rollers adapted to project over the platform above the same, means for moving the rollers from the carriage to the bearings, and means for drawing the bearings apart after the rollers are in position.

4. The combination of a platform on which a large woven wire belt may be laid, a pair of rollers, bearing members for the rollers, rails at each side of the platform on which said bearing members are slidable, a carriage adapted to move the rollers longitudinally from a position at one side of the platform to a position above the same, and means for moving the rollers from the carriage to the bearing members.

5. In an apparatus of the character described, the combination of a large flat surface adapted to receive an endless woven wire belt, a pair of rollers, bearing members therefor, parallel rails, one at each side of said surface on which said bearing members are mounted, one pair of said bearing members being slidable on the rails, means for forcibly moving the slidable pair of bearing members along the rails, means for securing the other members thereto at any desired position, and a carriage adapted to move said rollers longitudinally to and away from the flat surface and above the same.

6. The combination, with a platform adapted to receive an endless woven wire belt laid out along the same, of a pair of rollers, means for mounting the rollers at separated positions above said platform, a carriage for moving the rollers longitudinally to and away from the platform and above the same, and cranes for moving the rollers from the carriage to their mounting means.

7. The combination, with a platform adapted to receive an endless woven wire belt laid out along the same, of a pair of rollers, means for mounting the rollers at separated positions above said platform, a carriage for moving the rollers longitudinally to and away from the platform and above the same, and a pair of trolley hoists movable parallel with the platform for conveying the rollers from the carriage to their bearing means and vice versa.

8. The combination, with a platform, of a pair of rollers, means for mounting the rollers at separated positions above the platform, means for moving the rollers toward and away from each other when in position, means for rotating one of the rollers, and a carriage adapted to receive both of said rollers and adapted to be projected across and above the platform and movable to a position at one side of the same.

9. In an apparatus of the character described, the combination of a platform adapted to receive an endless belt, a pair of rollers, means for mounting the rollers at separated positions above the platform, and a longitudinally movable carriage adapted to receive both of said rollers and adapted to be projected across the platform above the same and movable to a position at one side thereof.

10. The combination of a platform adapted to receive an endless woven wire belt, a pair of rollers, means for mounting them at separated positions over the platform, means for raising one reach of the belt, a carriage, and supports at one side of the platform on which the carriage is longitudinally movable, said carriage being adapted to receive said rollers and thrust them under the raised portion of the belt.

11. The combination of a platform on which an endless woven wire belt may be laid, a pair of rollers, means for mounting them at separated positions above the platform, a longitudinally movable carriage adapted to receive both of the rollers and mounted on supports at one side of the platform and adapted to stand at a distance from the platform, and means for projecting said carriage across the platform and above the same while maintaining the front end of the carriage free from both reaches of the belt.

12. The combination of a surface on which an endless woven wire belt may be laid, a pair of rollers, means for mounting the rollers at separated positions above said surface, a carriage adapted to receive both the rollers, a series of supports for said carriage so arranged that the carriage is movable in a path parallel to the normal position of the rollers, and means for reciprocating said carriage so that it may be projected across said surface and above the same.

13. The combination of a surface on which a woven wire belt may be laid, a pair of rollers and means for mounting them at separated positions above said surface so that the belt may be run over the same, a carriage adapted to receive the rollers, a series of supports, rollers on said supports on which said carriage is movable, said carriages comprising a plurality of longitudinal structural members connected by cross members, and means for reciprocating said carriage so that it may be projected across and above said surface.

14. The combination of a platform on which a large woven wire belt may be laid, a pair of rollers, means for mounting them in parallel separated positions above the platform, means for raising the upper reach of said belt, thereby separating it from the lower reach and leaving a space between them, a carriage for said rollers movable transversely of the platform and belt, and means for reciprocating said carriage to project the rollers between the reaches of the belt without touching the same or allowing any of the rollers or carriage to rest on the belt.

15. The combination of a platform on which a woven wire belt may be laid, a pair of rollers, means for mounting the rollers in parallel separated positions above the platform, a light pole which may be inserted between the reaches of the belt without injuring the belt, means for raising said pole, means for supporting it in position above the platform leaving a space between the reaches of the belt, and a carriage for said rollers adapted to project longitudinally between the reaches of the belt without injuring either of them.

16. The combination of a platform on which a woven wire belt may be laid, a pair of rollers, means for mounting the rollers in parallel separated positions above the platform, two poles which may be thrust between the reaches of the belt, means for raising the poles and holding them separated and securing them in a position above the platform leaving spaces between the reaches of the belt, and a carriage for said rollers adapted to project longitudinally between the reaches of the belt without injuring either of them.

17. The combination of a platform, a pair of rollers, bearing members therefor adapted to hold the rollers in separated positions above the platform, a carriage for the rollers adapted to be projected across the platform and comprising a plurality of longitudinal members, means connecting the same and securing them together, a series of roller members on which said carriage is movable, one of said roller members being mounted close to the side of the platform and the next roller member at a distance spaced therefrom, said carriage being movable entirely off from the roller near the platform and adapted to stand in a position leaving a space between it and the platform.

18. The combination of a flat surface on which a woven wire belt may be laid, a pair of rollers and means for mounting them in parallel separated positions above the surface, a carriage movable in a path parallel to the normal position of the rollers, supporting means for said carriage on which it is movably positioned at one side of the surface, means for projecting one end of said carriage across and above the surface, and means for preventing the other end of the carriage rising from its supports.

19. The combination of a substantially flat surface on which an endless woven wire belt may be laid, a pair of rollers, means for mounting the rollers at separated positions over said surface, means for raising one reach of the belt, a carriage, and supports therefor at one side of said surface on which the carriage is longitudinally movable, said carriage being adapted to receive said rollers and thrust them under the raised portion of the belt without allowing the weight of the rollers or carriage to rest on any part of the belt.

20. The combination of a platform adapted to receive an endless woven wire belt, a pair of rollers, means for mounting the rollers at separated positions over the platform, means for raising one reach of the belt above the platform, a carriage for said rollers, supports for the carriage at one side of the platform, and means for moving the carriage to thrust it with the rollers thereon across and over the platform with the weight of the rollers and carriage resting entirely on said supports, whereby the rollers may be thrust across the platform underneath one reach of the belt without the weight of the carriage or rollers resting on any part of the belt.

In testimony whereof, I hereunto affix my signature in the presence of two witnesses.

HAMILTON LINDSAY.

Witnesses:
JUSTIN W. MACKLIN,
ALBERT H. BATES.

Copies of this patent may be obtained for five cents each, by addressing the "Commissioner of Patents, Washington, D. C."